(12) United States Patent
Pan et al.

(10) Patent No.: US 12,242,783 B1
(45) Date of Patent: Mar. 4, 2025

(54) DATA-DRIVEN CLOCK PORT AND CLOCK SIGNAL RECOGNITION

(71) Applicant: Synopsys, Inc., Mountain View, CA (US)

(72) Inventors: Gung-Yu Pan, Baoshan Township (TW); Ssu-Hsien Li, Hsinchu (TW); Che-Hua Shih, Hsinchu (TW); Yi-An Chen, Hsinchu (TW); Chia-Chih Yen, Taipei (TW)

(73) Assignee: Synopsys, Inc., Mountain View, CA (US)

(*) Notice: Subject to any disclaimer, the term of this patent is extended or adjusted under 35 U.S.C. 154(b) by 501 days.

(21) Appl. No.: 17/683,216

(22) Filed: Feb. 28, 2022

Related U.S. Application Data

(60) Provisional application No. 63/154,420, filed on Feb. 26, 2021.

(51) Int. Cl.
  *G06F 30/3308* (2020.01)
  *G06F 30/20* (2020.01)
  (Continued)

(52) U.S. Cl.
  CPC .......... *G06F 30/3308* (2020.01); *G06F 30/20* (2020.01); *G06F 30/27* (2020.01);
  (Continued)

(58) Field of Classification Search
  CPC ...... G06F 30/3308; G06F 30/20; G06F 30/27; G06F 30/367; G06F 30/396; G06F 30/398
  (Continued)

(56) References Cited

U.S. PATENT DOCUMENTS

| | | | | |
|---|---|---|---|---|
| 4,358,848 A | * | 11/1982 | Patel | G06F 11/1028 714/E11.046 |
| 5,010,573 A | * | 4/1991 | Musyck | H04L 9/0637 380/28 |

(Continued)

FOREIGN PATENT DOCUMENTS

| | | | | |
|---|---|---|---|---|
| BR | 102017026856 A2 | * | 6/2019 | ............. G06F 30/39 |
| CN | 105138774 B | * | 7/2018 | |

(Continued)

OTHER PUBLICATIONS

Xie, Chinese Patent Document No. CN-102412929-A, published Apr. 11, 2012, 3 pages including abstract and 1 drawing. (Year: 2012).*

*Primary Examiner* — Phallaka Kik
(74) *Attorney, Agent, or Firm* — Lowenstein Sandler LLP

(57) ABSTRACT

Operations to recognize clock ports within a simulation circuit component and/or recognize a clock signal within simulation waveforms are described. One or more of the operations include generating a plurality of output values at an output port of a circuit simulation component by applying, during a simulation, a plurality of input values to a first input port of the circuit simulation component. The operations also include calculating a correlation vector based on bit sequences in the input values and bit sequences in the output values. The first input port is determined to be a clock port by applying a machine learning model to the correlation vector. One or more of the operations include determining a waveform file comprising signals from a simulation, determining a subset of the signals are bit-level signals, calculating toggle metrics for the subset of the signals, identifying a signal from the subset with a toggle metric satisfying a toggle threshold, calculating, by a processor, multiple duty (Continued)

cycles for the signal, and determining the signal is a clock signal based on the multiple duty cycles.

20 Claims, 8 Drawing Sheets

(51) Int. Cl.
*G06F 30/27* (2020.01)
*G06F 30/367* (2020.01)
*G06F 30/396* (2020.01)
*G06F 30/398* (2020.01)

(52) U.S. Cl.
CPC .......... *G06F 30/367* (2020.01); *G06F 30/396* (2020.01); *G06F 30/398* (2020.01)

(58) Field of Classification Search
USPC .......................... 716/106, 111, 136; 703/16
See application file for complete search history.

(56) References Cited

U.S. PATENT DOCUMENTS

| | | | | |
|---|---|---|---|---|
| 6,014,510 A * | 1/2000 | Burks | ................. | G06F 30/3312 |
| | | | | 716/108 |
| 6,285,806 B1 * | 9/2001 | Kersey | ............... | G01D 5/35383 |
| | | | | 385/12 |
| 7,555,417 B2 * | 6/2009 | Greenberg | .............. | G06F 30/33 |
| | | | | 714/724 |
| 7,865,348 B1 * | 1/2011 | Au | ........................ | G06F 30/367 |
| | | | | 716/136 |
| 7,899,659 B2 * | 3/2011 | Tester | ..................... | G06F 30/33 |
| | | | | 345/440.1 |
| 8,626,483 B2 * | 1/2014 | Vermeersch | ............ | G06F 30/33 |
| | | | | 703/19 |
| 9,582,619 B1 * | 2/2017 | Liddell | ............... | G06F 30/3308 |
| 9,628,095 B1 * | 4/2017 | Liveris | .................... | H03L 7/145 |
| 10,423,740 B2 * | 9/2019 | Rabinovitch | ........... | G06F 30/33 |
| 10,599,881 B1 * | 3/2020 | Mehrotra | ............. | G06F 30/367 |
| 11,221,613 B2 * | 1/2022 | Cella | .................... | G05B 23/024 |
| 11,366,455 B2 * | 6/2022 | Cella | ................. | G05B 19/41845 |
| 2004/0202244 A1 * | 10/2004 | Pappalardo | ........... | G06F 13/423 |
| | | | | 375/240 |
| 2008/0072197 A1 * | 3/2008 | Ja | ........................ | G06F 30/3312 |
| | | | | 716/108 |
| 2010/0318342 A1 * | 12/2010 | Tamiya | ................... | G06F 30/33 |
| | | | | 703/14 |
| 2013/0207702 A1 * | 8/2013 | Bulzacchelli | ........ | H03K 17/005 |
| | | | | 327/164 |
| 2013/0332137 A1 * | 12/2013 | Balasubramanian | ... | G06F 30/33 |
| | | | | 703/14 |
| 2016/0020821 A1 * | 1/2016 | Derby | ................... | H04B 1/709 |
| | | | | 370/342 |
| 2018/0337816 A1 * | 11/2018 | Herath | .................. | H04L 27/362 |
| 2021/0282154 A1 * | 9/2021 | So | ........................ | H04W 12/033 |

FOREIGN PATENT DOCUMENTS

| | | | | |
|---|---|---|---|---|
| CN | 112036106 A | * | 12/2020 | ......... G06F 30/3312 |
| EP | 0508620 B1 | * | 5/1998 | ............. G06F 30/33 |

* cited by examiner

DATA-DRIVEN CLOCK PORT AND CLOCK SIGNAL RECOGNITION

CROSS-REFERENCE TO RELATED APPLICATIONS

This application is a non-provisional application that claims the benefit of U.S. Provisional Patent Application No. 63/154,420 filed on Feb. 26, 2021 and entitled "DATA-DRIVEN CLOCK PORT AND CLOCK SIGNAL RECOGNITION," which is incorporated by reference herein in its entirety.

TECHNICAL FIELD

The present disclosure is related to the field of integrated circuit (IC) design and electronic design automation (EDA), and more particularly to algorithms that determine clock ports and clock signals in simulation circuit modules and/or simulation waveforms.

BACKGROUND

Digital IC designs are driven by clock signals to provide synchronization between components. Hence, EDA tools need to process clocks throughout many IC design stages. Recognizing clock signals and clock ports is beneficial to the efficiency of EDA tools.

SUMMARY

One or more embodiments are directed towards operations to recognize clock ports within a simulation circuit module. One or more of the operations include generating one or more output values at an output port of a circuit simulation component by applying, during a simulation, one or more input values to a first input port of the circuit simulation component. The operation also includes calculating a correlation vector based on bit sequences in the input values and bit sequences in the output values. The operation includes determining, by a processor, the first input port is a clock port by applying a machine learning model to the correlation vector.

One or more embodiments are directed towards operations to recognize clock signals within simulation waveforms. One or more of the operations include determining a subset of the simulated waveforms are bit-level signals and then calculating toggle metrics for the subset of simulated waveforms. Duty cycles are calculated for the simulated waveforms with toggle metrics satisfying a toggle threshold. A simulated waveform is determined to be a clock signal based on its duty cycle.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure. The innovations, embodiments, and/or examples found within this disclosure are not all-inclusive, but rather describe the basic significance of the subject matter. Accordingly, one use of this Summary is as a prelude to a Detailed Description presented below.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

In the drawings, like reference numbers generally indicate identical or similar elements. Additionally, generally, the left-most digit(s) of a reference number identifies the drawing in which the reference number first appears.

DETAILED DESCRIPTION

Aspects of the present disclosure relate to one or more operations to recognize clock ports within a simulation circuit module and one or more operations to recognize a clock signal within simulation waveforms.

Conventionally, EDA tools rely on naming-based recognition to identify clock signals and clock ports. However, some clock signal or port names do not include "clock", "clk", "c", etc., while some non-clock signal or port names include "clock", ", clk", "c", etc. Some existing tools analyze the design netlist to identify clock ports and signals, but modern digital designs contain sophisticated clock configurations, such as gated clocks, multiple clock drivers, multiple clock domains, irregular duty cycle, and so on. Un-recognized or misclassified clock signals or ports need manual identification and correction and hence increase the design turn-around time.

The present disclosure provides an accurate approach to recognizing clock signals from simulation circuit modules and waveform files, according to some aspects. For the simulation circuit module, the functionality of each input port may be learned and classified by injecting semi-random patterns, then observing the output patterns during simulation, and then extracting and encoding features for classification by machine learning (ML) techniques, according to some aspects. In addition to clock ports, the power ports of the simulation circuit module may also be determined, according to some aspects. For simulation waveforms, the patterns may be driven by a test-bench. According to some aspects, the repetitiveness and regularity of each simulation waveform may be checked to determine if the waveform belongs to clock signal, while considering various issues such as gating and frequency scaling.

Embodiments of the present disclosure provide the technical advantage of accurately identifying clock signals by examining signal characteristics instead of the clock or port names. In addition to recognizing clock signals themselves, the disclosed algorithms can be integrated into existing EDA tools to recognize clock-trees and accelerate simulators. Once the clock signals are identified, the minimum cycle length of the signals may be determined automatically, which may have extensive applications.

Figure 1:
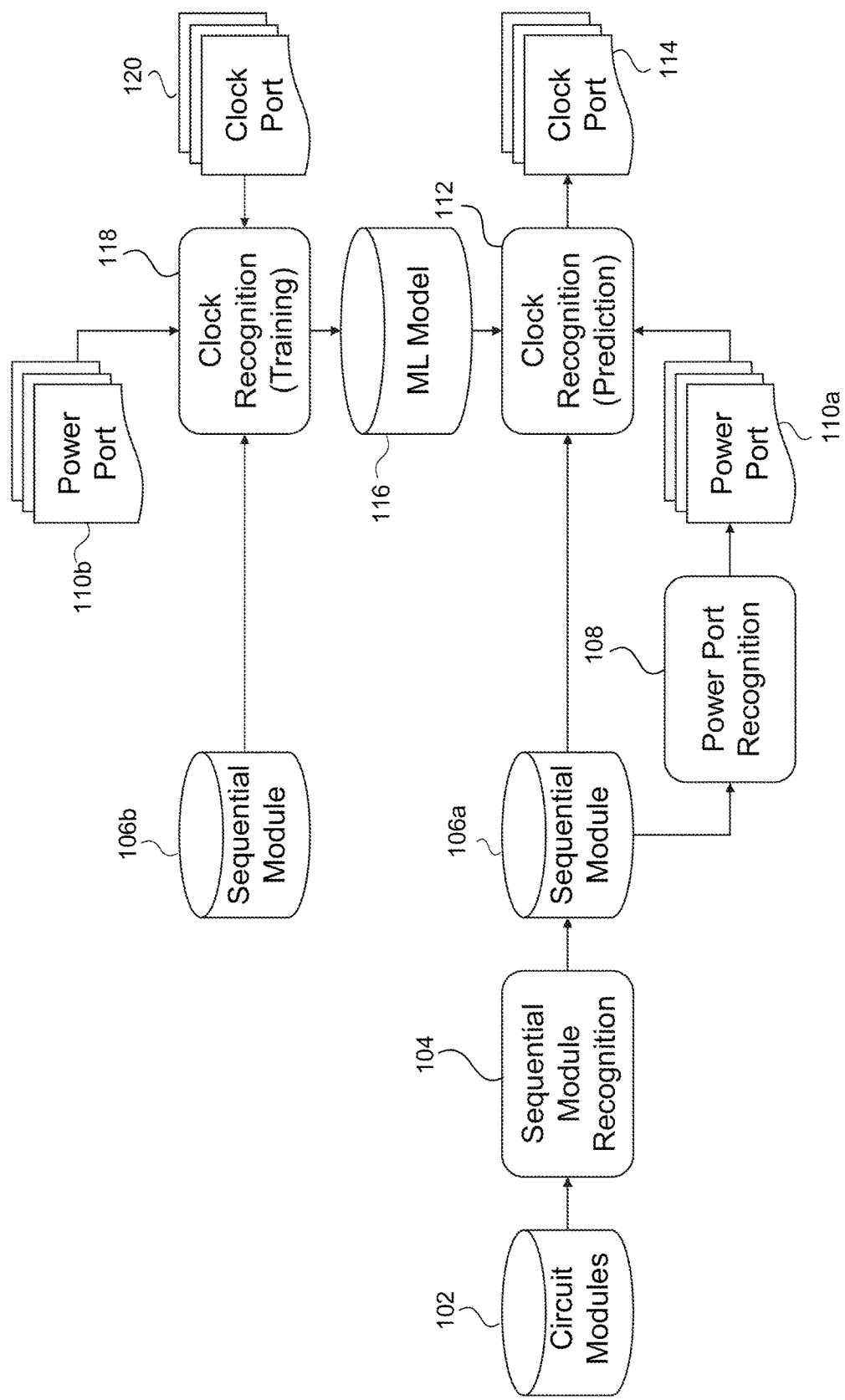
FIG. 1 depicts a process for determining a clock port of a circuit simulation module, according to some embodiments.

FIG. 1 illustrates a process for determining a clock port of a circuit simulation module, according to some aspects. According to some aspects, the process identifies a sequential module from a circuit module and uses a machine learning (ML) model to recognize clock ports corresponding to the sequential module.

According to some aspects, a sequential module 106a may be recognized from a circuit module 102 using sequential module recognition 104. According to some aspects, circuit module 102 contains several circuit simulation modules. According to some aspects, circuit modules 102 is a simulation library. A sequential module 106a may be identified in the circuit module 102 by examining the coding style of the module.

According to some aspects, a circuit simulation module may contain power ports, which should be connected to a correct input power values to turn on the circuit simulation module. When a power port is not connected to a correct input power value, the output port of the circuit simulation module may change to a 'X' (unknown) or a 'Z' (high-impendence) value. According to some aspects, power port recognition module 108 identifies the power ports 110a corresponding to sequential module 106a. According some aspects, power port recognition module 108 identifies power ports 110a by testing all primary inputs corresponding to sequential module 106a using a random pattern generator.

According to some aspects, clock recognition training module 118 may produce the ML module 116 during a training phase. During a prediction phase, clock recognition prediction module 112 may be used to identify clock ports of a sequential module 106a using the trained ML model 116. During a training phase, clock recognition training module 118 may be given a known sequential module 106b, power ports 110b and clock ports 120 corresponding to sequential module 106b as training inputs to the ML model 116. During prediction phase, clock recognition prediction module 112 may use the trained ML model 116, the input sequential module 106a and power ports 110a to identify clock ports 114.

Figure 2:
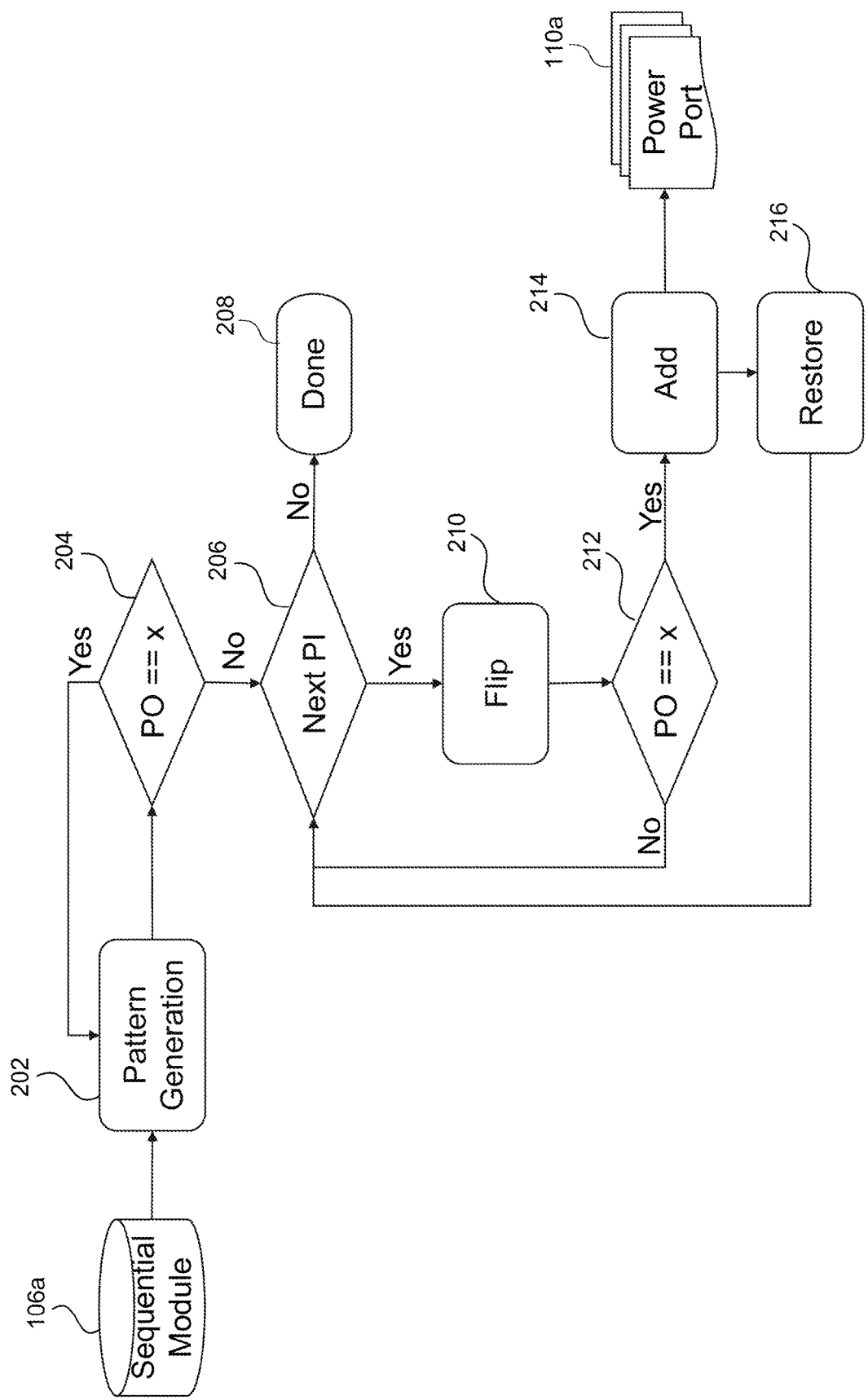
FIG. 2 depicts a process for identifying a power port of a circuit simulation, according to some embodiments.

FIG. 2 illustrates a process for identifying a power port of a circuit simulation module, and the corresponding power values, in accordance with one or more embodiments. According to some aspects, the process illustrated in FIG. 2 may be performed by power port recognition module 108. According to some aspects, sequential module 106a is input to a simulator with a pattern generator module 202. According to some aspects, for each circuit simulation module (e.g., sequential module), a sequence of random patterns may be injected into all the primary input (PI) ports until the primary output (PO) port changes to '0' or '1'. The duration of each cycle where the patterns switch may be longer than all the delays specified inside the circuit simulation module. A PO value of X, at 204, may indicate that the sequential module is not enabled, and a new random pattern sequence is generated for input to the PI ports.

According to some aspects, with the output port being '0' or '1', at 210, each input port takes turns to flip its value and simulate one cycle. If the output port remains '0' or '1', then the flipped input port is identified as not a power pin. Otherwise, a flipped input port may is identified as a power port, and the input port may be added to the list of power ports at 214, and the input value (power value) before flipping is recorded for this power port. At 216, the module is restored so that it can be enabled aging to test the next PI at 206.

According to some aspects, when the output port changes to 'X' or 'Z' after simulating one cycle, the simulation should may be restored to the state where the output port is '0' or '1'. This process may be repeated until all input ports or each sequential module are examined. The process depicted in FIG. 2 may be applied to circuit simulation modules that may have or may not have clock input ports.

Figure 3:
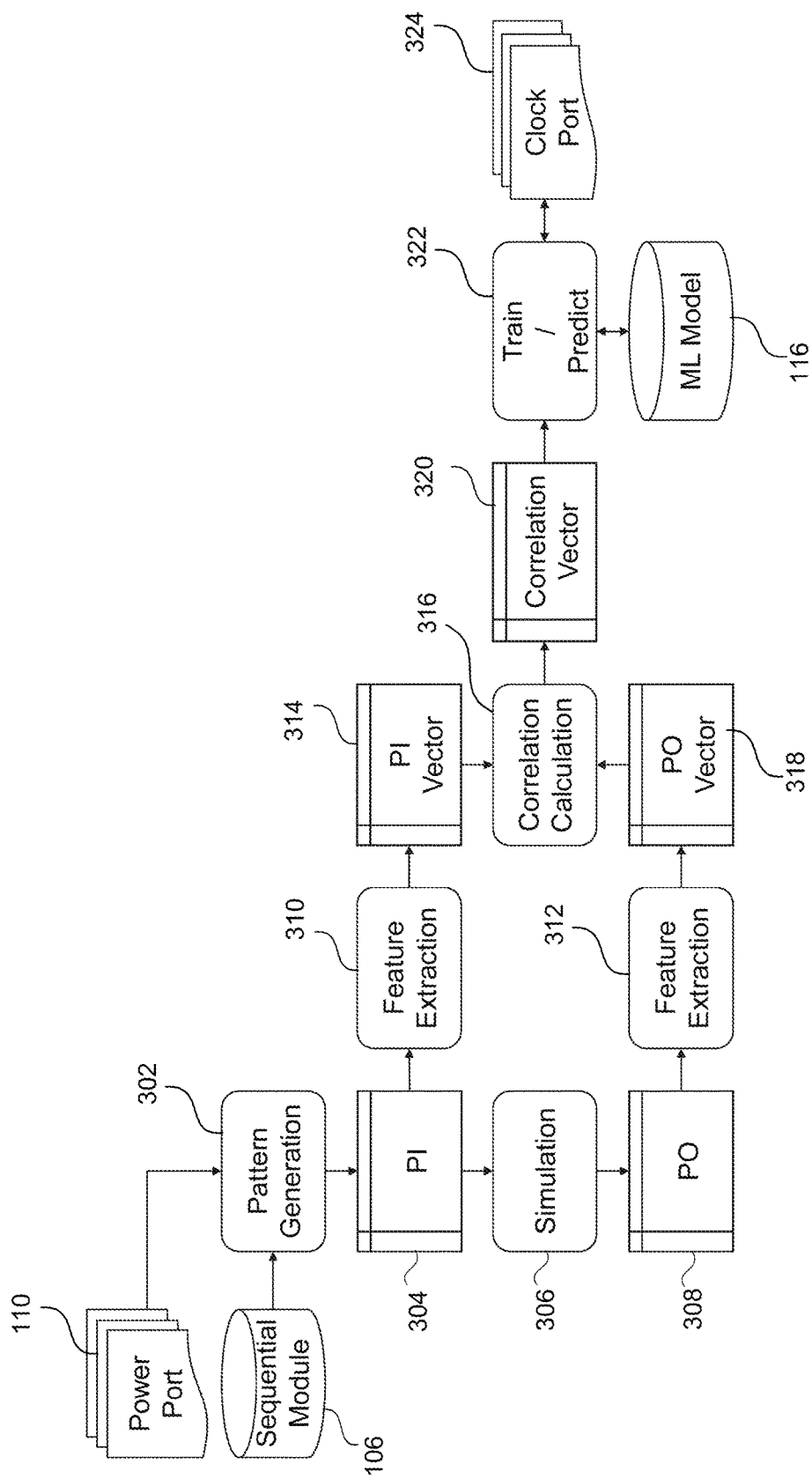
FIG. 3 depicts a process for using a machine learning model to classify a port of a circuit simulation module, according to some embodiments.

FIG. 3 depicts a process for using a machine learning model to classify a port of a circuit simulation module, according to some aspects. According to some aspects, during a training phase, train/predict module 322 corresponds to the clock recognition training module 118. During a prediction phase, train/predict module 322 corresponds to the clock recognition prediction module 112.

According to some aspects, sequential module 106 is input to a simulator with a pattern generator module 302. For each circuit simulation module, the power ports are assigned appropriate power values, and random patterns are injected into other input ports for a fixed number of cycles. According to some aspects, the cycle duration may be longer than all the intrinsic delay. According to some aspects, the simulator generates primary output (PO) 308 corresponding to primary input (PI) 304. According to some aspects, PI and PO are binary bit strings.

According to some aspects, features corresponding to the PI and PO are extracted using feature extraction modules 310 and 312. According to some aspects, extracted features may include the number of change values of the PI and PO, number of zeros, number of ones, and duration of the ones of the PI and POs. Based on the extracted features corresponding to PI 304, a PI vector 314 may be generated. According to some aspects, based on the extracted features corresponding to PO 308, a PO vector 318 may be generated. According to some aspects, for any two consecutive bits, there may be four combinations: 0-0, 0-1, 1-0, or 1-1. According to some aspects, we can extract one or more of the following features: a number of value changes, a number of value changes to one, and a duration of zero. According to some aspects, the feature 'a number of value changes' may be extracted as 0, 1, 1, 0. According to some aspects, the feature 'number of value changes to one' may be extracted as 0, 1, 0, 0. According to some aspects, the feature 'duration of zero' may be extracted as 2, 1, 1, 0. In general, we can scan and encode the original PI and PO as one-hot vectors to include all possible features.

According to some aspects, based on the extracted features corresponding to PI 304, a binary PI vector 314 may be generated. According to some aspects, bits from PI and PO are scanned and encoded using a one-hot encoding function to generate binary PI and PO vectors. According to some aspects, the one-hot encoding function may convert categorical data corresponding to PI 304 and PO 308 into a numerical format that can be used by train/predict module 322 to generate ML model 116.

According to some aspects, a correlation value corresponding to each PI and PO pair may be calculated at 316 to generate a correlation vector 320. The correlation value of PI and PO may range between a 0 and a 1. According some aspects, the correlation value depends on the type if the PI and PO. As an example, so there May 16 combinations of PIs and POs (e.g., 4 possible bit sequences at the PI (i.e., 0-0, 0-1, 1-1, 1-0), 4 possible bit sequences at the PO (i.e., 0-0, 0-1, 1-1, 1-0)). With the simulation running long-enough, the distribution of the PI and PO combinations could reflect the characteristics of different types of input ports. For example, positive-edge clock ports may have a higher correlation on PI being 0-1 than PO being 0-1 or 1-0.

According to some aspects, correlation feature vectors 320 are fed into the supervised learning train/predict engine module 322. In the training phase, clock ports 324 correspond to clock ports 114 and in the prediction phase, clock ports 324 correspond to clock ports 120. In the training phase, the features and the labels with known clock ports 120 may be fed into the engine to train ML model 116. In a predicting phase, the engine exploits the ML model 116 to identify whether each port is a clock 114 based on the input features and the trained ML model 116. According to some aspects, the engine may contain several supervised learning algorithms where a validation set is exploited to determine which model is best fit for the framework.

Figure 4:
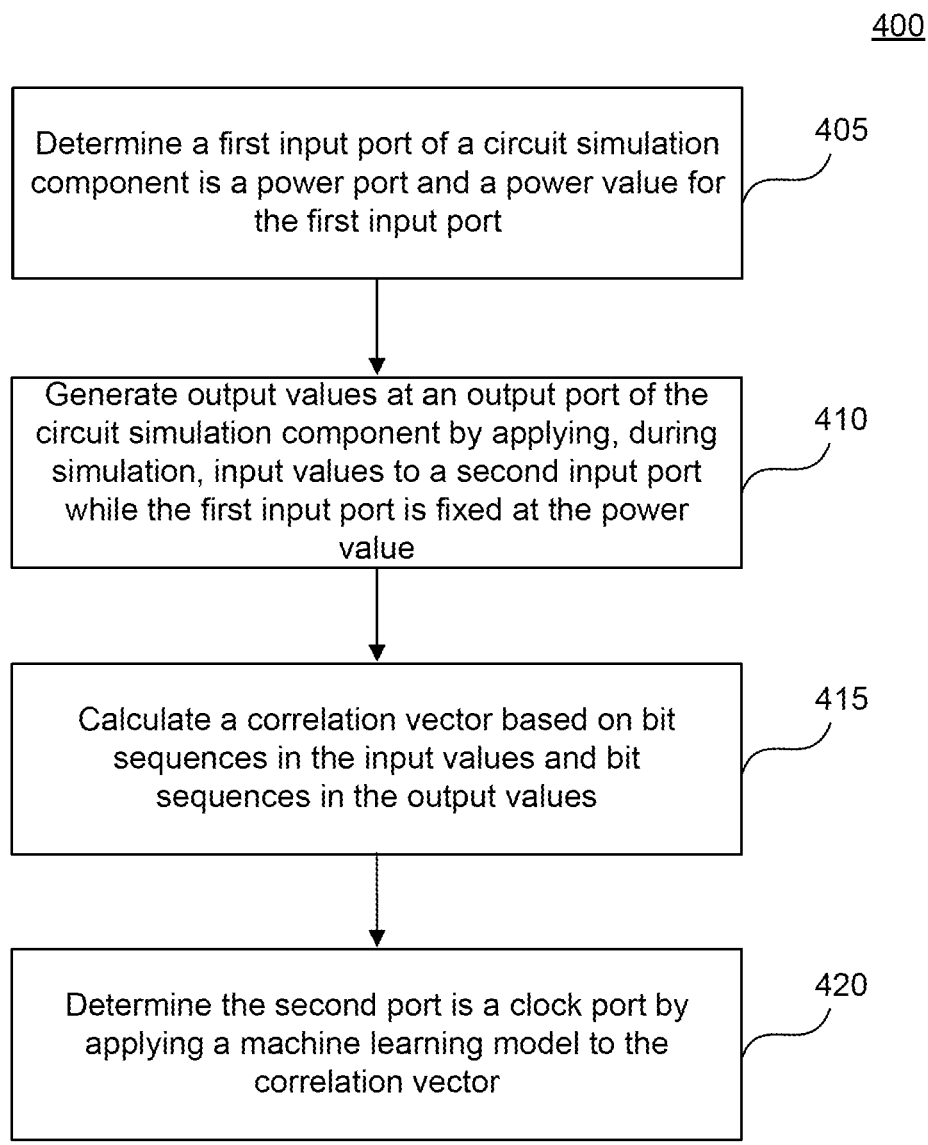
FIG. 4 depicts a flowchart for determining a clock port of a circuit simulation component, according to some embodiments.

FIG. 4 depicts a flowchart for determining a clock port of a circuit simulation component (e.g., circuit simulation module such as, for example, a sequential model) in accordance with one or more embodiments. At 405, it is determined that a first input port of a circuit simulation component is a power port. A power value for the first input port is also determined. According to some aspects, for each circuit simulation module, a sequence of random patterns may be injected into all the primary input (PI) ports until the primary output (PO) port changes to '0' or '1'. According to some aspects, with the output port being '0' or '1', each input port may take turns to flip its value and simulate one cycle. If the output port does not remain a '0' or '1' (changes to an X value), the flipped input port may be identified as a power pin, and the input port may be added to the list of power ports at 214, and the input value (power value) before flipping is recorded for this power port.

Additionally or alternatively, the power ports and power values may be known in advance and stored in a file or memory. In such cases, determining that the first input port is a clock port includes accessing the file or memory where such information is stored.

At 405, output values at an output port of the circuit simulation component are generated, during simulation, by applying input values to a first input port of the circuit simulation module. According to some aspects, features corresponding to the input values and the output values are extracted using a feature extraction modules. According to some aspects, extracted features may include the number of change values of the input and output values, number of zeros, number of ones, and duration of the ones of the input and output value pairs.

At 410, a correlation vector is calculated based on the bit sequences in the plurality of input values and the bit sequences in the plurality of output values. Based on the extracted features corresponding to input and output values, a binary sequence may be generated. For each bit sequence pair, a correlation value is calculated, resulting in generating a correlation vector corresponding to a plurality of input and output value pairs.

At 415, the second port is determined to be a clock port by applying a machine learning model to the correlation vector. Additional details regarding 405, 410, and 415 are discussed above in reference to FIG. 3.

Figure 5:
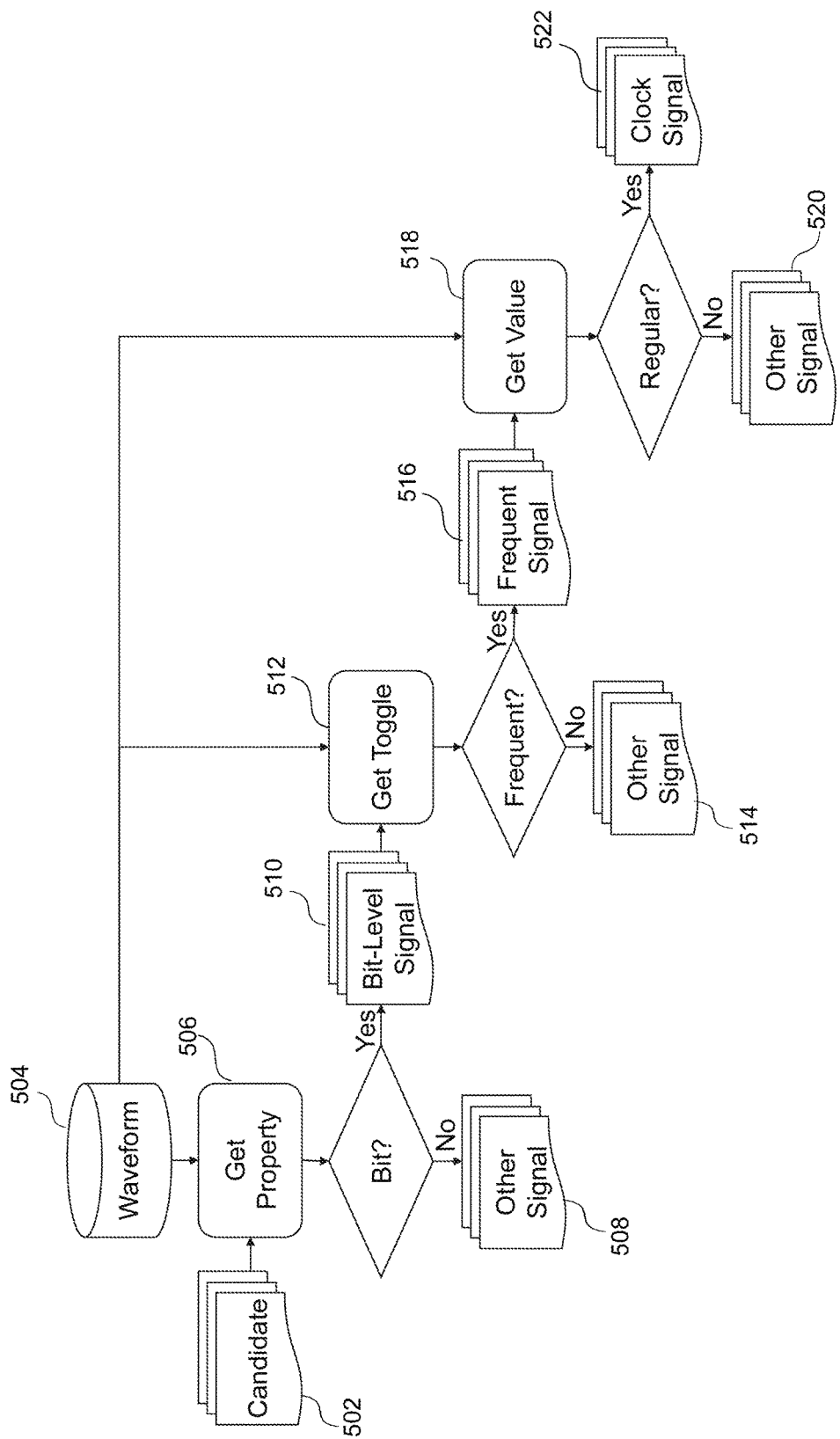
FIG. 5 depicts a process for determining a clock signal within simulation waveforms, according to some embodiments.

FIG. 5 illustrates a process for determining a clock signal within simulation waveforms, according to some aspects of the disclosure. According to some aspects, given a simulation waveform and a list of candidate signals, clock signals may be efficiently identified from the list of candidate signals using a three-step examination process. According to some aspects, the candidate signals may be a subset of the waveform. According to some aspects, the steps include checking a property of the candidate signal, checking a toggle count of the candidate signal, and checking sampled waveform shape of the candidate signal.

According to some aspects, for each candidate signal 502, certain properties are retrieved by a get-property module 506, based on waveform 504. According to some aspects, the retrieved properties could include an identification of the type of the candidate waveform. According to some aspects, a candidate signal could be a real-valued signal or a bus vector signal. According to some aspects, a candidate signal of the waveform may be a bit level signal. A bit level signal may be a binary level signal corresponding to a binary bit string. According to some aspects, a candidate signal may correspond to an assertion, text, real numbers, or composite signals.

According to some aspects, a classification of the candidate signals is performed to separate bit-level signals 510 from the other signals 508 that are not bit-level signals. According to some aspects, bit-level signals of the candidate signals may be identified by detecting the amplitude levels of the candidate signals. According to some aspects, other signals 508 may be discarded from the candidate signal list, since a clock signal may not be a non-bit-level signal.

According to some aspects, the toggling frequency for each bit-level signal 510 may be determined to identify clock signals in the set of bit-level signals 510. A get-toggle module 512 may determine a toggle count for each signal of the bit-level signals 510. According to some aspects, get-toggle module 512 may determine the toggle count based on the waveform 504 and the set of bit-levels signals 510. According to some aspects, the toggle count of a signal corresponds to the number of rising and falling edges of the signal. According to some aspects, toggle count of a signal may correspond to the number of amplitude changes of the signal in a unit of time.

According to some aspects, based on the toggle count, the set of bit-level signals may be classified as a frequent signal 516 and other signals 514. According to some aspects, a signal is classified as a frequent signal 516 if the toggle count of signal exceeds a threshold. The threshold value may be a maximum toggle value multiplied by a user defined ratio between 0% and 100% (between 0 and 1). According to some aspects, the threshold may be lowered to identify slave clocks that may run at less frequency than a master clock.

According to some aspects, for each single of frequent signals 516, samples cycles inside specific windows are acquired based on waveform 504. According to some aspects, get-value module 518 calculates the duty cycle of each frequent signal 516. The duty cycle may correspond to a valid cycle with 0-1-0-1 or 1-0-1-0 signal transitions. According to some aspects, a duty cycle may correspond to a ratio of the on-portion and the off-portion of the signal. The frequent signals 516 that have regular duty cycles are identified as clock signals 522. According to some aspects, signals with a regular duty cycle maintain a consistent duty cycle value over a duration of time.

Figure 6:
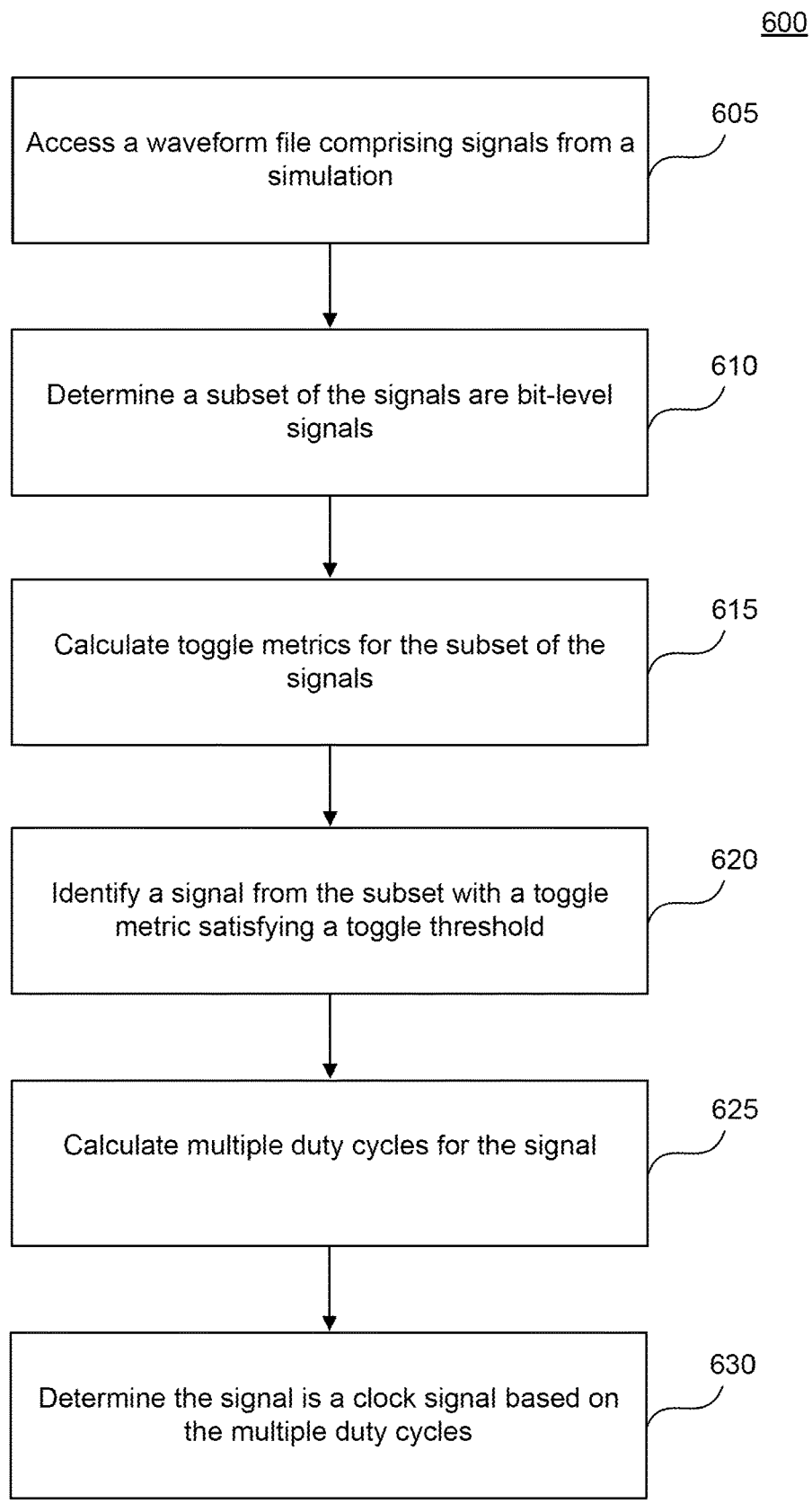
FIG. 6 depicts a flowchart for determining a clock signal within simulation waveforms, according to some embodiments.

FIG. 6 depicts a flowchart for determining a clock signal within a waveform file, according to some aspects. At 605, a waveform file comprising signals from a simulation may be accessed. According to some aspects, a waveform file may comprise a set of candidate clock signals. At 610, a subset of the signals is determined to be bit-level signals. A bit level signal may be a binary level signal corresponding to a binary bit string. According to some aspects, bit-level signals of the candidate signals may be identified by detecting the amplitude levels of the subset of signals.

At 615, toggle metrics are calculated for the subset of signals determined to be bit-level signals. According to some aspects, the toggle metric may be a toggle count of a signal that corresponds to number of rising and falling edges of the signal in a unit time. According to some aspects, toggle count of a signal may correspond to the number of amplitude changes of the signal in a unit of time.

At 620, a signal from the subset with a toggle metric satisfying (e.g., exceeding) a toggle threshold is identified. According to some aspects, the toggle threshold value may be a maximum toggle value multiplied by a user-defined ratio between 0% and 100% (between 0 and 1). According to some aspects, the toggle threshold may be a lower threshold to identify slave clocks that may run at a less frequency than a master clock.

At 625, multiple duty cycles for the identified signal are calculated. A duty cycle of a signal may correspond to a valid cycle with 0-1-0-1 or 1-0-1-0 signal transitions. According to some aspects, a duty cycle may correspond to a ratio of the on-portion and the off-portion of a cycle of a signal. At 630, the identified signal is determined to be a clock signal based on the multiple duty cycles. According to some aspects, an identified signal that has a regular duty cycle is identified as a clock signal. According to some aspects, signals with a regular duty cycle may maintain a consistent duty cycle value over a duration of time. Additional details regarding 605, 610, 615, 620, 625, and 630 are discussed above in reference to FIG. 5.

Figure 7:
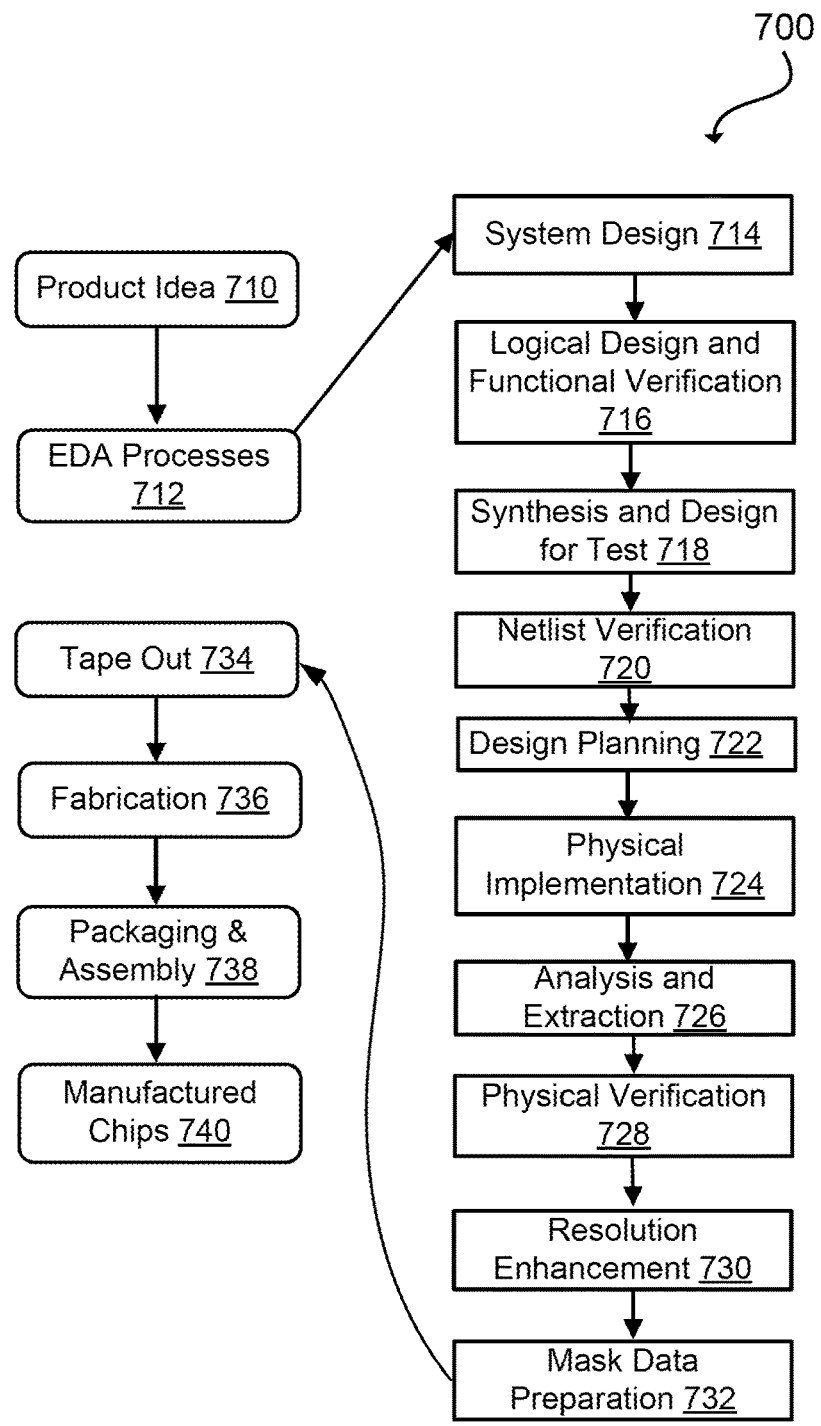
FIG. 7 depicts a flowchart of various processes used during the design and manufacture of an integrated circuit.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool).

The set of processes in FIG. 7 may use the flows depicted in FIG. 4 and/or FIG. 6. For example, the flows described in FIG. 4 and FIG. 6 may be enabled/executed by EDA products (or tools). These EDA products (or tools) are examples of software applications that may be involved in or utilize the systems and processes depicted in FIGS. 1-6, discussed above.

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
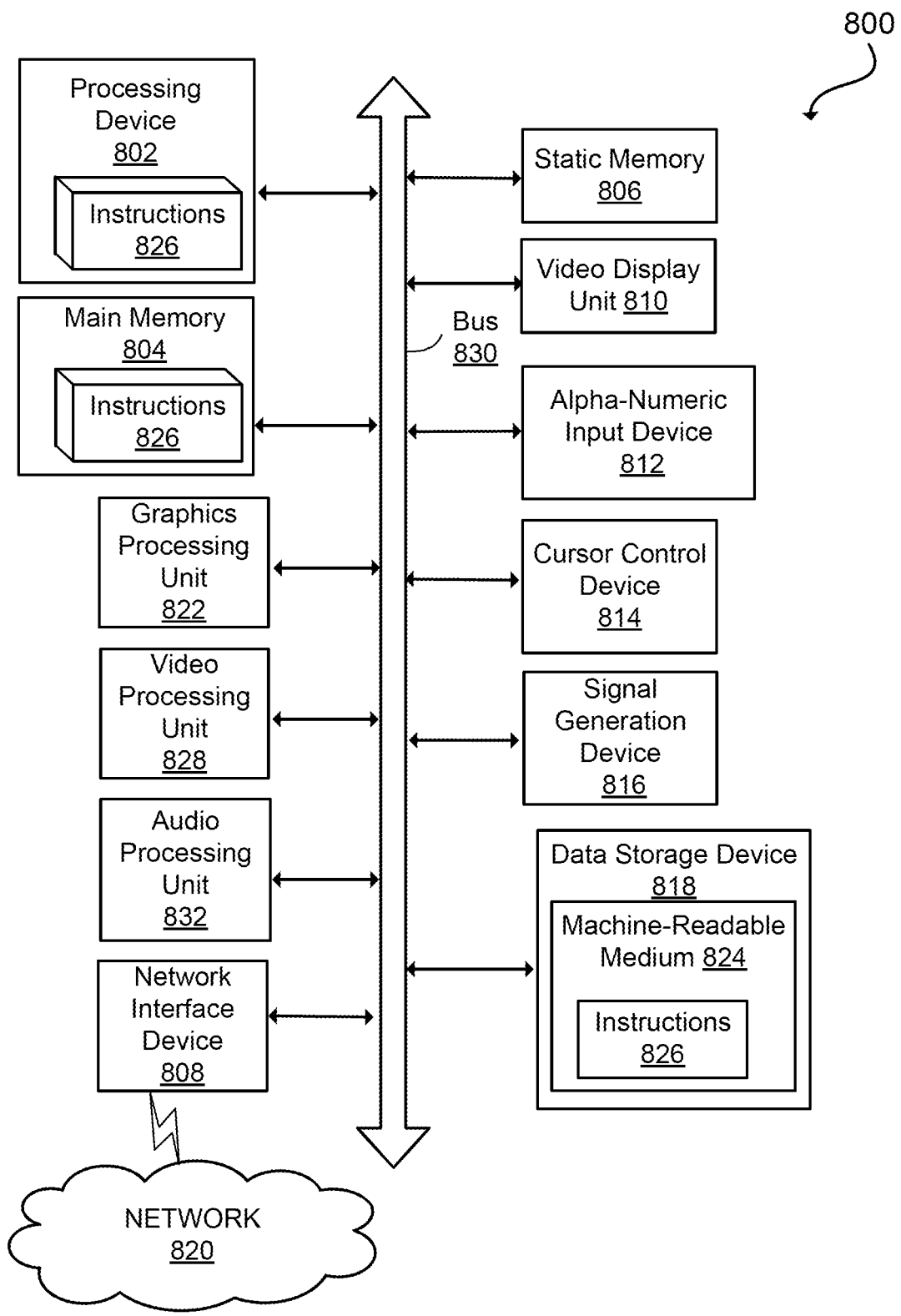
FIG. 8 depicts an abstract diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   generating a plurality of output values at an output port of a circuit simulation component by applying, during a simulation, a plurality of input values to a first input port of the circuit simulation component;
   calculating a correlation vector based on bit sequences in the plurality of input values and bit sequences in the plurality of output values; and
   determining, by a processor, the first input port is a clock port by applying a machine learning model to the correlation vector.

2. The method of claim 1, further comprising:
   determining a second input port of the circuit simulation component is a power port and a power value for the second input port, wherein the second input port is fixed at the power value during the simulation.

3. The method of claim 2, wherein the determining further comprises:
   inputting a random pattern into the second input port that changes the corresponding output port value to a one or a zero.

4. The method of claim 1, further comprising:
   training the machine learning model using clock ports and correlation vector corresponding to a well-known sequential module.

5. The method of claim 1, wherein the calculating the correlation vector further comprising:

extracting features corresponding to the plurality input values, wherein the features include on or more of a number of value changes, a number of value changes to one, and a duration of zero.

6. The method of claim 1, comprising:
   determining an input port of a circuit simulation component is a power port and a power value for the input port.

7. The method of claim 1, wherein the correlation vector comprises correlation values that range from zero to one.

8. A method, comprising:
   accessing a waveform file comprising signals from a simulation;
   determining a subset of the signals are bit-level signals;
   calculating toggle metrics for the subset of the signals;
   identifying a signal from the subset with a toggle metric satisfying a toggle threshold;
   calculating, by a processor, multiple duty cycles for the signal; and
   determining the signal is a clock signal based on the multiple duty cycles.

9. The method of claim 8, wherein the bit-level signals are binary level signals corresponding to binary bit strings.

10. The method of claim 8, wherein the calculating toggle metrics further comprises:
    calculating a number of rising and falling edges of a signal of the subset of signals in a unit of time.

11. The method of claim 8, wherein the toggle threshold is a maximum toggle value multiplied by a value between 0 and 1.

12. The method of claim 8, wherein a duty cycle of the multiple duty cycle corresponds to a cycle with 0-1-0-1 or 1-0-1-0 signal transitions.

13. The method of claim 8, wherein the calculating the multiple duty cycles further comprises:
    calculating a ratio of on-portion and off-portion of a cycle of the signal.

14. The method of claim 8, wherein the determining the signal is the clock signal further comprises:
    determining that the signal maintains a consistent duty cycle value over a duration of time.

15. A non-transitory computer readable medium (CRM) comprising stored instructions, which when executed by a processor, cause the processor to perform operations comprising:
    generating a plurality of output values at an output port of a circuit simulation component by applying, during a simulation, a plurality of input values to a first input port of the circuit simulation component;
    calculating a correlation vector based on bit sequences in the plurality of input values and bit sequences in the plurality of output values; and
    determining the first input port is a clock port by applying a machine learning model to the correlation vector.

16. The non-transitory CRM of claim 15, wherein the stored instructions, when executed by the processor, cause the processor to perform operations further comprising:
    determining a second input port of the circuit simulation component is a power port and a power value for the second input port, wherein the second input port is fixed at the power value during the simulation.

17. The non-transitory CRM of claim 16, wherein the determining the second input port of the circuit simulation component is a power port further comprises:
    inputting a random pattern into the second input port that changes the corresponding output port value to a one or a zero.

18. The non-transitory CRM of claim 15, wherein the stored instructions, when executed by the processor, cause the processor to perform operations further comprising:
   training the machine learning model using clock ports and correlation vector corresponding to a well-known sequential module.

19. The non-transitory CRM of claim 15, wherein the calculating the correlation vector further comprises:
   extracting features corresponding to the plurality input values, wherein the features include on or more of a number of value changes, a number of value changes to one, and a duration of zero.

20. The non-transitory CRM of claim 15, wherein the correlation vector comprises correlation values that range from zero to one.

* * * * *